United States Patent
Aati et al.

(10) Patent No.: US 12,315,177 B2
(45) Date of Patent: May 27, 2025

(54) SYSTEMS AND METHODS FOR OPTICAL IMAGE GEOMETRIC MODELING

(71) Applicant: CALIFORNIA INSTITUTE OF TECHNOLOGY, Pasadena, CA (US)

(72) Inventors: Saif Aati, Pasadena, CA (US); Jean-Philippe Avouac, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 230 days.

(21) Appl. No.: 17/472,338

(22) Filed: Sep. 10, 2021

(65) Prior Publication Data

US 2022/0084224 A1    Mar. 17, 2022

Related U.S. Application Data

(60) Provisional application No. 63/077,192, filed on Sep. 11, 2020.

(51) Int. Cl.
*G06T 7/33* (2017.01)
*G06T 7/55* (2017.01)

(52) U.S. Cl.
CPC ............. *G06T 7/344* (2017.01); *G06T 7/337* (2017.01); *G06T 7/55* (2017.01); *G06T 2207/10036* (2013.01); *G06T 2207/10041* (2013.01)

(58) Field of Classification Search
CPC .......... G06T 7/344; G06T 7/337; G06T 7/55; G06T 2207/10036; G06T 2207/10041; G06T 2207/10021; G06T 2207/30181; G06T 7/38; G06T 7/593; G06T 7/33
See application file for complete search history.

(56) References Cited

U.S. PATENT DOCUMENTS

| | | | | |
|---|---|---|---|---|
| 4,221,462 A | * | 9/1980 | Huvers | G02B 30/35 359/470 |
| 5,309,522 A | * | 5/1994 | Dye | G06T 7/593 348/42 |
| 6,249,616 B1 | * | 6/2001 | Hashimoto | G06T 7/35 382/284 |
| 8,121,433 B2 | | 2/2012 | Leprince et al. | |
| 8,452,123 B2 | | 5/2013 | Leprince et al. | |
| 2007/0090990 A1 | * | 4/2007 | Nelson | G01S 7/003 342/60 |

(Continued)

FOREIGN PATENT DOCUMENTS

CN        110388898 B  *  3/2021

OTHER PUBLICATIONS

C. Junqing, J. Tao, L. Wenhu and H. Mingqin, "The geometric correction and accuracy assessment based on Cartosat-1 satellite image," 2010 3rd International Congress on Image and Signal Processing, Yantai, China, 2010, pp. 1253-1257, doi: 10.1109/CISP.2010.5647273. (Year: 2010).*

(Continued)

*Primary Examiner* — Charles T Shedrick
(74) *Attorney, Agent, or Firm* — Steinfl + Bruno LLP (57) ABSTRACT

Refining a rational functional model (RFM) by subdividing the multiple images into multiple groups of sub-images according to the imaging sensor, then performing the RFM refinement for each group separately and estimating a 3D transformation using the sub-images from the central sensor as a reference.

18 Claims, 10 Drawing Sheets

(56) References Cited

U.S. PATENT DOCUMENTS

| | | | | |
|---|---|---|---|---|
| 2015/0371431 | A1* | 12/2015 | Korb | G06V 10/60 |
| | | | | 382/113 |
| 2019/0025423 | A1* | 1/2019 | Sajwaj | E03B 7/003 |
| 2020/0103530 | A1* | 4/2020 | Cheng | G01S 13/865 |
| 2022/0180600 | A1* | 6/2022 | Hu | G06T 7/55 |

OTHER PUBLICATIONS

Aati, S., et al., "Comparative study of photogrammetry software in industrial field," Rev. Française Photogrammétrie Télédétection1, 2020, pp. 37-48. 12 Pages.

Aati, S., "Textured 3D Model over Morenci Mine and Shisper Glacier Using SkySat and PlanetScope Satellite Imagery 2020.," Available online: https://doi.org/10.5281/zenodo.4009926. Accessed on Aug. 6, 2020. Webpage downloaded Sep. 17, 2021. 3 Pages.

Aguilar, M.A., et al., "Generation and Quality Assessment of Stereo-Extracted DSM From GeoEye-1 and WorldView-2 Imagery," IEEE Trans. Geosci. Remote Sens, 52, 1259-1271. 2013. 13 Pages.

Bethmann, F., et al., "Semi-Global Matching inObject Space," ISPRS Int. Arch. Photogramm. Remote Sens. Spat. Inf. Sci. 2015,XL-3/W2. Pages 23-30. 8 Pages.

Bhambri, R., et al., "The hazardous 2017-2019 surge and river damming by Shispare Glacier, Karakoram," Sci. Rep., 10, 4685. 2020. 14 Pages.

Carswell Jr., W.J. "The 3D Elevation Program: summary for Arizona"; Reston, VA, 2014, 2 pages.

Chang, Y., et al., "Automatic Contrast-LimitedAdaptive Histogram Equalization With Dual Gamma Correction," IEEE Access vol. 6, Jan. 25, 2018. pp. 11782-11792. 11 Pages.

d'Angelo, P., et al., "Evaluation of Skybox Video andStill Image products," ISPRS Int. Arch. Photogramm. Remote Sens. Spat. Inf.Sci. 2014, ISPRS Technical Commission I Symposium, Nov. 17-20, 2014 . XL-1. pp. 95-99. 5 Pages.

d'Angelo, P. et al., "Skybox image and video product evaluation," Int. J. Image Data Fusion 7, 2016. pp. 3-18. 24 Pages.

de Franchis, C., et al., "Automatic sensor orientation refinement of Pleiades stereo images," In Proceedings of the International Geoscience and Remote Sensing Symposium (IGARSS), Quebec City, QC, Canada, Jul. 13-18, 2014. 4 Pages.

Deseilligny, M.P., et al., "Apero, an Open SourceBundle Adjustment Software for Automatic Calibration and Orientation of Set ofImages," ISPRS Int. Arch. Photogramm. Remote Sens. Spat. Inf. Sci., 3816, 2011. pp. 269-276. 8 Pages.

Fraser, C., et al., "Bias Compensation in Rational Functions for Ikones Satellite Imagery," Photogramm. Eng. Remote Sens., 69, 1, Jan. 2003. 5 Pages.

Fusiello, A., et al., "A compact algorithm forrectification of stereo pairs," Mach. Vis. Appl., 12, 2000. pp. 16-22.8 Pages.

Ghuffar, S., "DEM generation from multi satellite PlanetScope imagery," Remote Sens. 10, 1462. Published: Sep. 13, 2018. 22 pages.

Grodecki, J., et al., "Block adjustment ofhigh-resolution satellite images described by Rational polynomials," Photogramm.Eng. Remote Sens 69, Jan. 2003. pp. 59-68. 10 Pages.

Habib, A.F., et al., "Bundle Adjustment with Self-Calibration Using Straight Lines," Photogramm. Rec., 17, 100, Oct. 2002. pp. 635-650.16 Pages.

Hirschmuller, H., "Stereo Processing by SemiglobalMatching and Mutual Information," IEEE Trans. Pattern Anal. Mach. Intell, 30, 2008.pp. 328-341.14 pages.

Hu, Y., et al., "Understanding the Rational Function Model: Methods and Applications," In Proceedings of the XXth International Society for Photogrammetry and Remote Sensing Congress, Istanbul, Turkey, Jul. 12-23, 2004. 7 Pages.

Huang, X., et al., "Multi-View Large-Scale Bundle Adjustment Method for High-Resolution Satellite Images," In Proceedings of the ASPRS 2019 Annual Conference, Denver, CO, USA, Jan. 28-30, 2019. 11 Pages.

Jacobsen, K., et al., "DEM generation with short base length pleiades triplet," ISPRS Int. Arch. Photogramm. Remote Sens. Spat. Inf. Sci. 2015, 40, 81-86. 6 Pages.

Kääab, A., et al., "River-ice and water velocities using the Planet optical cubesat constellation," Hydrol. Earth Syst. Sci., 23, Oct. 22, 2019. pp. 4233-4247. 15 Pages.

Kubik, P., et al., "First in-flight results of Pleiades1A innovative methods for optical calibration," In Proceedings of theInternational Conference on Space Optics ICSO 2012, Ajaccio, France, Oct. 9-12, 2012; SPIE: Bellingham, WA, USA, 2012; vol. 10564.10 Pages.

Leprince, S., et al., "Automatic and Precise Orthorectification, Coregistration, and Subpixel Correlation of Satellite Images, Application to Ground Deformation Measurements," IEEE Trans. Geosci. Remote.Sens. 45. Jun. 2007. pp. 1529-1558. 30 Pages.

Leprince, S., et al., "In-Flight CCD Distortion Calibration for for Pushbroom Satellites Based on Subpixel Correlation,"IEEE Trans. Geosci. Remote Sens, 46, 2675-2683. Sep. 2008. 9Pages.

Murthy K. et al., "SkySat-1: very high resolution imagery from a small satellite." In Proceedings of the Sensors, Systems, and Next-Generation Satellites XVIII; 2014; vol. 9241, pp. 367-378.

Nagel, G.W., et al., "Nanosatellites applied to optical Earth observation: A review," Rev. Ambient. Água, vol. 15 No. 3, 2020. 19 Pages.

Neigh, C.S.R., et al. "High-Resolution Satellite Data Open for Government Research," Eos. Trans. Am. Geophys. Union, 94, 121-123. 2013.2 Pages.

Perko, R., et al., "Mapping with Pléiades—End-to-EndWorkflow," Remote Sens., 11, 2052. Sep. 1, 2019. 52 Pages.

Perko, R., et al., "Very high resolution mapping with the Pleiades satellite constellation,". Am. J. Remote Sens. 6, 2. pp. 89-99. 2018. 12 Pages.

Planet Labs Education and Research Program. Available online: https://www.planet.com/markets/educationand-research/. Accessed on Jun. 4, 2020. Downloaded Sep. 17, 2021. 11 Pages.

Planet Labs Planet Tasking On-Demand High-Resolution Intelligence. Available online: https://learn.planet.com/rs/997-CHH-265/images/PlanetTaskingOne-pager_Letter_Print.pdf. Accessed on Aug. 6, 2020. Webpage downloaded Aug. 17, 2021. 11 Pages.

Poli, D., et al., "Evaluation Of Pleiades-1a Triplet On Trento Testfield," ISPRS Int. Arch. Photogramm. Remote Sens. Spat. Inf. Sci., XL-1/W1, 287-292. 2013. 6 Pages.

Poli, D., et al., "Radiometric and geometricevaluation of GeoEye-1, WorldView-2 and Pleiades-1A stereo images for 3Dinformation extraction," ISPRS J. Photogramm. Remote Sens. 100, 35-47. 2015.14 Pages.

Poli D. et al., "Review of developments in geometric modelling for high resolution satellite pushbroom sensors." Photogramm. Rec. 2012, 27, 58-73, doi:10.1111/j.1477-9730.2011.00665.x.

Raggam, H., et al., "Surface mapping using imagetriplets: CaseStudies and Benefit Assessment in Comparison to Stereo Image Processing," Photogramm. Eng. Remote Sens. 72, N. 5. May 2006.pp. 551-563.13 pages.

Rashid, I., et al., "The Jan. 2018 to Sep. 2019 surge of Shisper Glacier, Pakistan, detected from remote sensing observations," Geomorphology, 351, 106957. 2019. 27 pages.

R.G.I. Consortium, Randolph Glacier Inventory-a dataset of global glacier outlines: version 6.0. Glob. L. Ice Meas. from Space, Color. USA, Tech. Rep, 2017. 71 pages.

Rupnik, E., et al., "MicMac—A free, open-sourcesolution for photogrammetry," Open Geospatial Data Softw. Stand., 2 , 14. 2017.9 Pages.

Rupnik, E., et al., "Refined satellite image orientation in the free open-source photogrammetric tools Apero/Micmac," ISPRS Ann. Photogramm. Remote Sens. Spat. Inf. Sci. 2016, 3, 83. XXIII ISPRS Congress, Jul. 12-19, 2016, Prague, Czech Republic. 8 Pages.

Santillan, J., et al., "Vertical Accuracy Assessment Of 30-M Resolution Alos, Aster, And Srtm Global Dems Over Northeastern Mindanao, Philippines," ISPRS Int. Arch. Photogramm. Remote Sens. Spat. Inf. Sci., XLI-B4, pp. 149-156. Jun. 2016. 9 Pages.

Scovanner, P., et al., "A 3-Dimensional SiftDescriptor and Its Application to Action Recognition," In Proceedings of the15th ACM International Conference on Multimedia, Augsburg, Ger- (56) References Cited

OTHER PUBLICATIONS many, Sep. 23-28, 2007; Association for Computing Machinery: New York, NY, USA, 2007;pp. 357-360. 4 Pages.

Shah, A., et al., "Risk assessment of Shishper Glacier, Hassanabad Hunza, North Pakistan," J. Himal. Earth Sci., 52, 1-11.2019. 12 Pages.

Takaku J. et al., "PRISM On-Orbit Geometric Calibration and DSM Performance." IEEE Trans. Geosci. Remote Sens. 2009, 47, 4060-4073, doi:10.1109/TGRS.2009.2021649.

Tao, C., et al., "A Comprehensive Study of theRational Function Model for Photogrammetric Processing," Photogrammetric. Eng. Remote. Sens. 67. Dec. 2001. pp. 1347-1357. 12 Pages.

USGS Shuttle Radar Topography Mission. Available online: https://www.usgs.gov/centers/eros/science/usgseros-archive-digital-elevation-shuttle-radar-topography-mission-srtm-void?qt-science_center_objects=0#qt-science_center_objects. Accessed on May 4, 2020. Webpage downloaded Sep. 17, 2021. 8 Pages.

Villela, T., et al., "Towards the Thousandth CubeSat: A Statistical Overview," Int. J. Aerosp. Eng., Article ID 5063145. 2019. 14 pages.

Xiong, Z., et al., "A generic method for RPCrefinement using ground control information," Photogramm. Eng. Remote Sens. 75,9, Sep. 2009. pp. 1083-1092.10 Pages.

Zhang G et al., "Auto-calibration of GF-1 WFV images using flat terrain." *ISPRS J. Photogramm. Remote Sens.* 2017, 134, 59-69, doi:https://doi.org/10.1016/j.isprsjprs.2017.10.009.

\* cited by examiner

SYSTEMS AND METHODS FOR OPTICAL IMAGE GEOMETRIC MODELING

CROSS-REFERENCE TO RELATED APPLICATIONS

The present application is related to and claims priority to U.S. Patent Application No. 63/077,192 filed on Sep. 11, 2020, the disclosure of which is incorporated herein by reference in its entirety.

STATEMENT REGARDING FEDERALLY SPONSORED RESEARCH OR DEVELOPMENT

This invention was made with government support under Grant No. 80NSSC20K0492 awarded by NASA. The government has certain rights in the invention.

BACKGROUND

The impact of environmental changes and human activities has increased the need for monitoring the Earth surface. The recognition of this need has stimulated an exponential increase in Earth Observation (EO) satellites, in particular CubeSat™ nanosatellites for optical remote sensing. Due to their low cost, a great number of CubeSats have been launched over the last six years by a variety of private companies, universities and non-conventional actors in the space industry, enabling unprecedented high spatial and temporal resolution optical images.

The capability to acquire multi-temporal data with improved spatial, spectral, radiometric and temporal resolution should enhance our ability to monitor geomorphic processes (e.g., landslides, coastal erosion, Aeolian processes), ground deformation due to earthquakes or landslides, mountain glaciers and ice caps disaster damages, and human activities (e.g., urbanization, infrastructure development, mining operations). These applications require a good knowledge of the geometry of the images to allow for the calculation of accurate Digital Elevation Models (DEM) and for precise georeferencing of the images, ideally with a sub-pixel precision. DEMs can then be extracted based on a Rigorous Sensor Modeling (RSM) of the image geometry taking into account both the internal (optical distortions, CCD misalignments) and external (telescope position and orientation) parameters. As a standardized substitute to the rigorous sensor model, the geometry of optical images is now commonly represented using a Rational Function Model (RFM).

SUMMARY

Systems and methods for sensor-agnostic refining of the RFM for optical imaging is disclosed herein. The system uses first order polynomial bias compensation in the image-space and can be applied to any image with a geometry model provided in the RFM standard. It can be applied to push-broom images delivered in the RFM format. It yields sub-pixel orthorectification facilitating detection of changes at the Earth surface or tracking of small objects (e.g., a car driving on a road) with high fidelity.

This method yields results similar to other methods (see e.g., U.S. Pat. No. 8,121,433 "Ortho-Rectification, Coregistration, and Subpixel Correlation of Optical Satellite and Aerial Images", and U.S. Pat. No. 8,452,123 "Distortion Calibration for Optical Sensors") but does not require access to metadata and/or technical information about the sensors.

In a first aspect of the disclosure, a method for refining a rational function model for optical imaging is disclosed, the method comprising: obtaining data from a plurality of detector arrays of a sensor; subdividing the data into a plurality of images corresponding to each detector array of the plurality of detector arrays; performing rational function model refinement on each of the plurality of images separately for each of the plurality of images; and estimating a three-dimensional transformation using reference images from a reference array from the plurality of detector arrays.

In a second aspect of the disclosure, a method for refining a rational function model for optical imaging, the method comprising: obtaining a first plurality of images from a first sensor comprising a first detector array and a second plurality of images from a second sensor comprising a second detector array; determining paired images from the first plurality of images with images from the second plurality of images; subdividing the first and second plurality of images into a plurality of groups corresponding to the paired images; performing rational function model refinement on each of the plurality of groups separately for each of the plurality of groups; and estimating a three-dimensional transformation using a reference image from the first or second plurality of images.

In a third aspect of the disclosure, a method for refining a rational function model for optical imaging is disclosed, the method comprising: obtaining a first plurality of images from a sensor at a first time and a second plurality of images from the sensor at a second time; determining paired images from the first plurality of images with images from the second plurality of images; subdividing the first and second plurality of images into a plurality of groups corresponding to the paired images; performing rational function model refinement on each of the plurality of groups separately for each of the plurality of groups; and estimating a three-dimensional transformation using a reference image from the first or second plurality of images.

This disclosure covers, among other things, the methods described, computer media containing software performing the methods, and systems and devices designed to carry out the methods.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIGS. 1A-1C show examples of sensor capture.

DETAILED DESCRIPTION

As used herein, a "sensor" is a device for collecting image data. A sensor can comprise an ensemble of detector arrays placed in the focal plane of a telescope. For the purposes of this disclosure, a single array can also be considered a "sensor".

As used herein, an "array" or "optical array" or "detector array" is a collection of one or more detectors acting as a single image acquisition system. For the purposes of this disclosure, a single detector can also be considered an "array".

As used herein, an "image" is either a snapshot from an array or a frame from a video procured from an array.

The input data can be a mosaic of images acquired at different times by the different CCD arrays. The pixels that are acquired simultaneously by a single array of CCD can be identified, decomposing the mosaic into its images.

As used herein, a "track" is a series of adjacent (with or without overlap) images taken consecutively in time from one array of a sensor as the imaging system (platform) moves along its trajectory, for example an orbit for a satellite platform. The phrase "along-track" means between images of the same track, and the phrase "across-track" means between images of different tracks. Tracks (e.g., 150A and 150B) can be parallel (as shown for example in FIG. 1B, 150A) or askew to other tracks.

As used herein, the term "platform" refers to the housing and/or vehicle that contains the sensor and related imaging systems, such as onboard a satellite, such as CubeSat™. Other platforms can also be used as understood by one skilled in the art (e.g., balloon, aircraft, tower, etc.).

In embodiments of the disclosure, the method includes obtaining a plurality of images.

In embodiments of the disclosure, the method can include obtaining a plurality of images from a corresponding plurality of optical arrays.

Figure 1A:
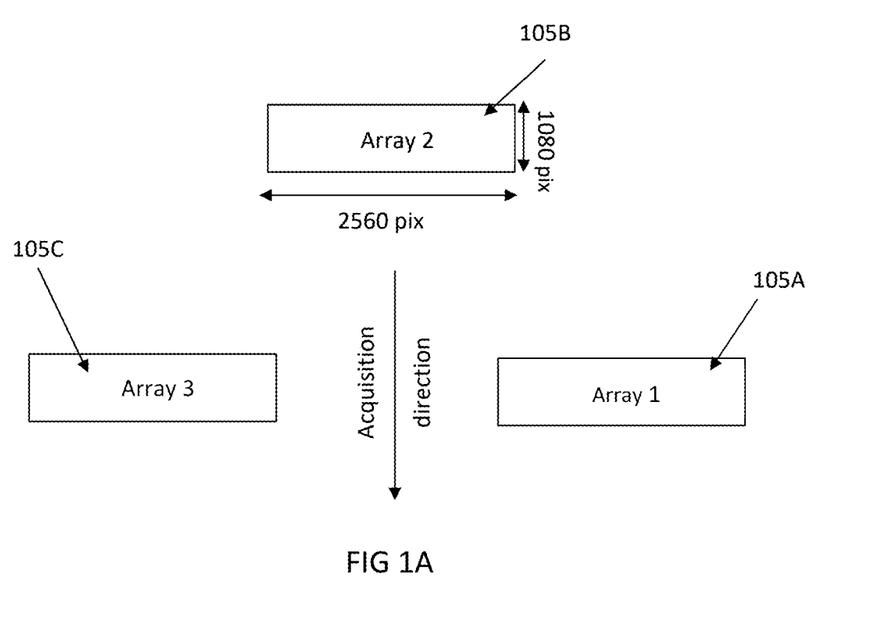
FIG. 1A shows a sketch of a push-frame system composed of three detector arrays.
Figure 1B:
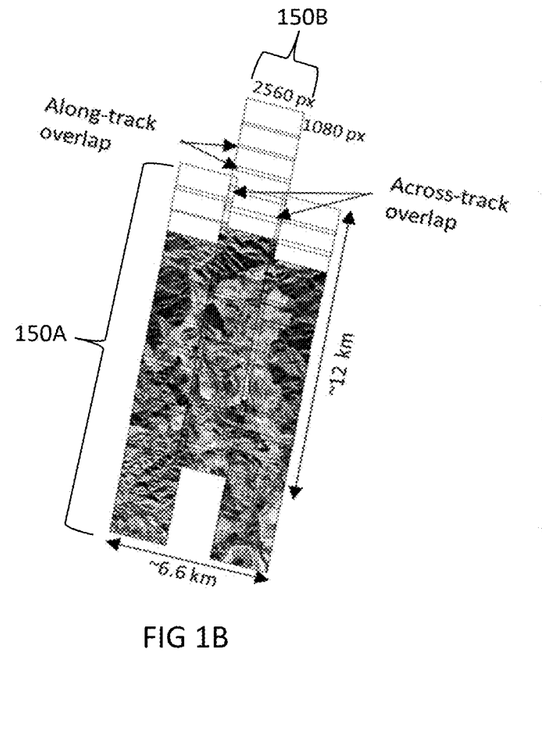
FIG. 1B shows the footprint of a single track acquisition by a three-array sensor.
Figure 1C:
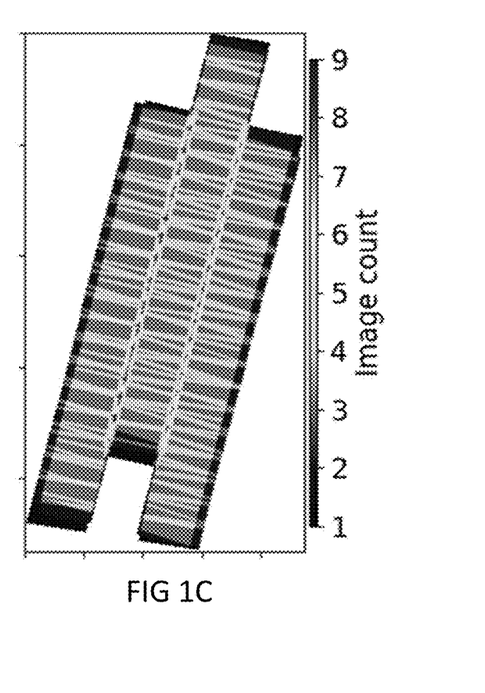
FIG. 1C shows an example of counting overlapped images of a tri-stereo acquisition tracks.

In some embodiments, the plurality of optical arrays can all be on the same platform. For example, SkySat™ satellites use a three-array system, such as shown in FIG. 1A. The image acquired by the central array overlaps slightly 'across track' with the images acquired by the 2 lateral arrays. The images acquired by a given array at one time overlap along track with the images acquired at the previous and next sampling time. The overlaps are shown in FIGS. 1B and 1C.

In embodiments, the plurality of optical arrays can be spread over multiple platforms. For example, PlanetScope™ DOVE™ satellites use a one array system. For one array systems, multiple images over time can be combined from multiple platforms to provide images with both along-track overlap (between images from the same platform) and across-track overlap (between images from different platforms), just as the multiple-array system, just with the tracks possibly not running parallel.

In embodiments of the disclosure, the method can include obtaining a plurality of images from a single optical array. For example, a single optical array can obtain the plurality of images in a pattern similar to FIGS. 1B-1C (several tracks of images) either by scanning multiple areas during the pass or by the platform making multiple passes over the same area at slight offsets in what location is viewed. In some embodiments the images are panchromatic, although multispectral images could also be used with this method as well as other image types as understood by one skilled in the art.

In embodiments of the disclosure, the method can include obtaining a plurality of images from a single optical array. For example, a single optical array can obtain the plurality of images in a pattern similar to FIGS. 1B-1E (several tracks of images) either by scanning multiple areas during the pass or by the platform making multiple passes over the same area at slight offsets in what location is viewed. In some embodiments the images are panchromatic, although multispectral images could be also be used with this method as well as other image types as understood by one skilled in the art.

In some embodiments of the disclosure, the method includes subdividing the plurality of images into a plurality of groups corresponding to tracks of the plurality of images. The images are subdivided in order to perform RFM refinement on each subdivision separately.

An example of subdividing is shown in FIG. 1A. In this example, a three-array sensor provides frames of raw data (105A, 105B, 105C) from the three arrays: Array 1, Array 2, and Array 3. These correspond to images in the three tracks generated in a single pass (see FIGS. 1B and 1C). These are subdivided into the three frames (105A, 105B, 105C) based on the corresponding tracks.

For some embodiments where the tracks cannot be directly corresponded to arrays from a single platform imaging in parallel (e.g., multiple platforms or multiple passes), subdividing includes pairing frames before subdividing. In some embodiments, pairing frames can be based on a maximum overlap between frames. For example, in the data from the top-most frame taken first in the track, chronologically, for DOVE-C-1033 is paired with the top-most frame taken last in the track, chronologically, for DOVE-C-0f24 would be paired, then subdivided into DOVE-C-1033 and DOVE-C-0f24.

In some embodiments, RFM refinement—and subsequent 3D reconstruction—is limited to certain images/image pairs. In some embodiments, this can be determined by comparing a base-to-height (B/H) ratio to a B/H threshold value (e.g., greater than/at least 15%, greater than/at least 25%, etc.).

The angle θ between incidence view vectors from overlapping scenes, also called the 'convergence angle', is determined by computing the angle of intersection of two view vectors $u_1$ and $u_2$, $$\theta = \cos^{-1}\left(\frac{u_1 \cdot u_2}{\lceil u_1 \rceil \cdot |u_2|}\right) \quad (1)$$

The view vector u is computed as follows: for a pixel in an overlap with coordinates (x, y), define two ground points M and N, where $M=RFM_Z^{-1}(x, y)$ and $N=RFM_{Z*\lambda}^{-1}(x, y)$, λ is a scale factor. Then, the view vector u is defined with respect to these two points.

The base-to-height (B/H) ratio is estimated, ignoring the Earth curvature, from $$\frac{B}{H} = 2\tan\frac{\theta}{2} \quad (2)$$

In some embodiments, the cross-track overlap is compared to a cross-track threshold value (e.g., 40%) and those pairs that exceed the threshold are used for RFM refinement.

In some embodiments, both cross-track overlap and B/H is checked for RFM refinement.

In some embodiments of the disclosure, the method includes performing rational function model refinement on each of the plurality of groups separately for each of the plurality of groups.

The rational function model (RFM) is sensor agnostic and allows for a standardization of the metadata. The RFM relates image pixel coordinates to object coordinates in the form of rational functions expressed as the ratios of polynomials, usually of third order, $$c_n = \frac{p_1(lat_n, lon_n, alt_n)}{p_2(lat_n, lon_n, alt_n)}, \quad (3)$$

$$r_n = \frac{p_3(lat_n, lon_n, alt_n)}{p_4(lat_n, lon_n, alt_n)},$$

$$p_l(lat_n, lon_n, alt_n) = \sum_{i=0}^{3}\sum_{j=0}^{i}\sum_{k=0}^{j} c_m^l lat_n^{i-j} lon_n^{j-k} alt_n^k, \quad (4)$$

$$m = \frac{i(i+1)(i+2)}{6} + \frac{j(j+1)}{2} + k,$$

where ($c_n$, $r_n$) are the normalized values of the image point coordinates (c, r), and ($lat_n$, $lon_n$, $alt_n$) are the normalized latitude, longitude, and altitude of the corresponding ground point, respectively. The normalization of the coordinates performed according to the process described in C. V. Tao and Y. A. Hu's, "Comprehensive Study of the Rational Function Model for Photogrammetric Processing" (2001), the contents of which are incorporated by reference herein. $c_m^l$ (l=1, 2, 3) refers to the coefficients of the polynomials $p_l$.

In embodiments of the disclosure, the RFM refinement is performed without using the physical parameters of the sensors.

Figure 2:
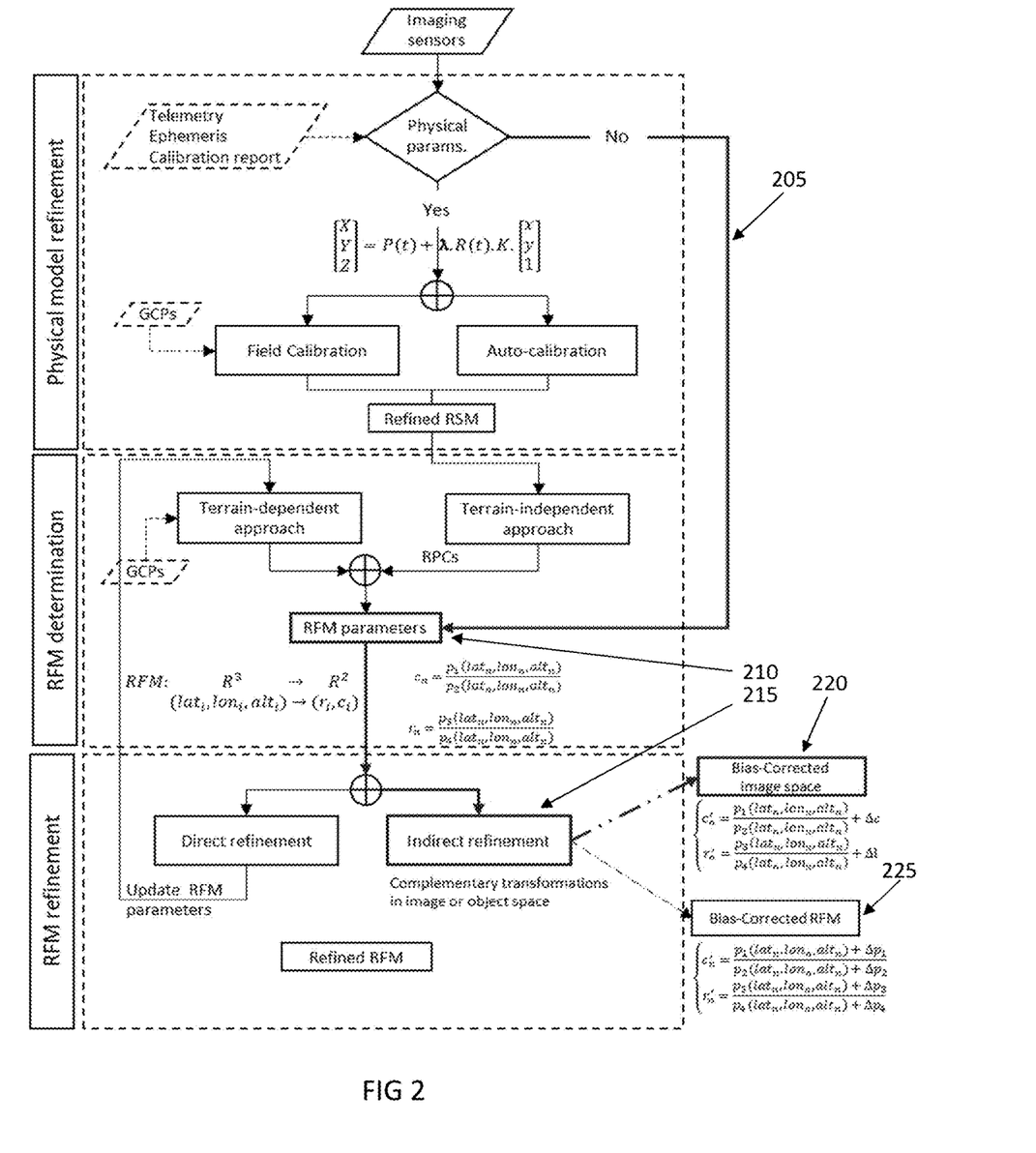
FIG. 2 shows an example of RFM refinement that includes the improvements described herein.

FIG. 2 shows an example of RFM refinement, with and without using the physical parameters of the sensors. The methods and systems herein allow for the RFM refinement without the physical parameters. If it is determined that the physical parameters of the sensors are not available or should not be used (205), then the method goes directly to RFM parameter determination (210), where the RFM is refined indirectly (215) in order to produce a bias-corrected image space (220) and/or bias-corrected RFM (225). An example of when the physical parameters would not be used is in a push-frame scenario.

Indirect refinement refines by determining corrective terms. The corrective terms can be expressed in image space as:

$$\Delta c_{ij} = a_0 + a_1 \cdot c_{ij} + a_2 \cdot r_{ij} \quad (5)$$

$$\Delta r_{ij} = b_0 + b_1 \cdot c_{ij} + b_2 \cdot r_{ij} \quad (6)$$

where $a_k$, $b_k$ are the adjustment parameters for image i, and ($c_{ij}$, $r_{ij}$) are the image coordinates of point j on image i.

A least-squares adjustment routine can be used to minimize the re-projection errors of a selection of tie points, $$F_{c_{ij}} = \Delta c_{ij} - c'_{ij} + c_{ij} \quad (7)$$

$$F_{r_{ij}} = \Delta r_{ij} - r'_{ij} + r_{ij} \quad (8)$$

where ($c'_{ij}$, $r'_{ij}$) are the image-space coordinates of tie point j on image i, ($c_{ij}$, $r_{ij}$) are the nominal image coordinates computed with the RFM function model given in Equation (3), and ($\Delta c_{ij}$, $\Delta r_{ij}$) are the bias compensation functions (cf. Equations (5) and (6)).

The normal equations then write, $$\Delta X = (A^T A)^{-1} A^T B, \quad (9)$$

where $$A = \frac{\partial F_c}{\partial X} \frac{\partial F_r^T}{\partial X}$$

is the Jacobian matrix, B is the discrepancy vector and X is the parameter vector $[lon_{ij}\ lat_{ij}\ alt_{ij}\ a_{0i}\ a_{1i}\ a_{1i}\ a_{2i}\ b_{0i}\ b_{1i}\ b_{2i} a_{0i}]^T$.

The method described here can be implemented as a module in the open-source version of the COSI-Corr software package. This module allows, among other things: (1) to correct the RFM bias of a single image using GCPs, (2) to correct the RFM bias of a large block of overlapping images, and (3) to incorporate the bias compensation into the original supplied RFMs. This method can be employed to process any type of images delivered with RFMs.

Figure 3:
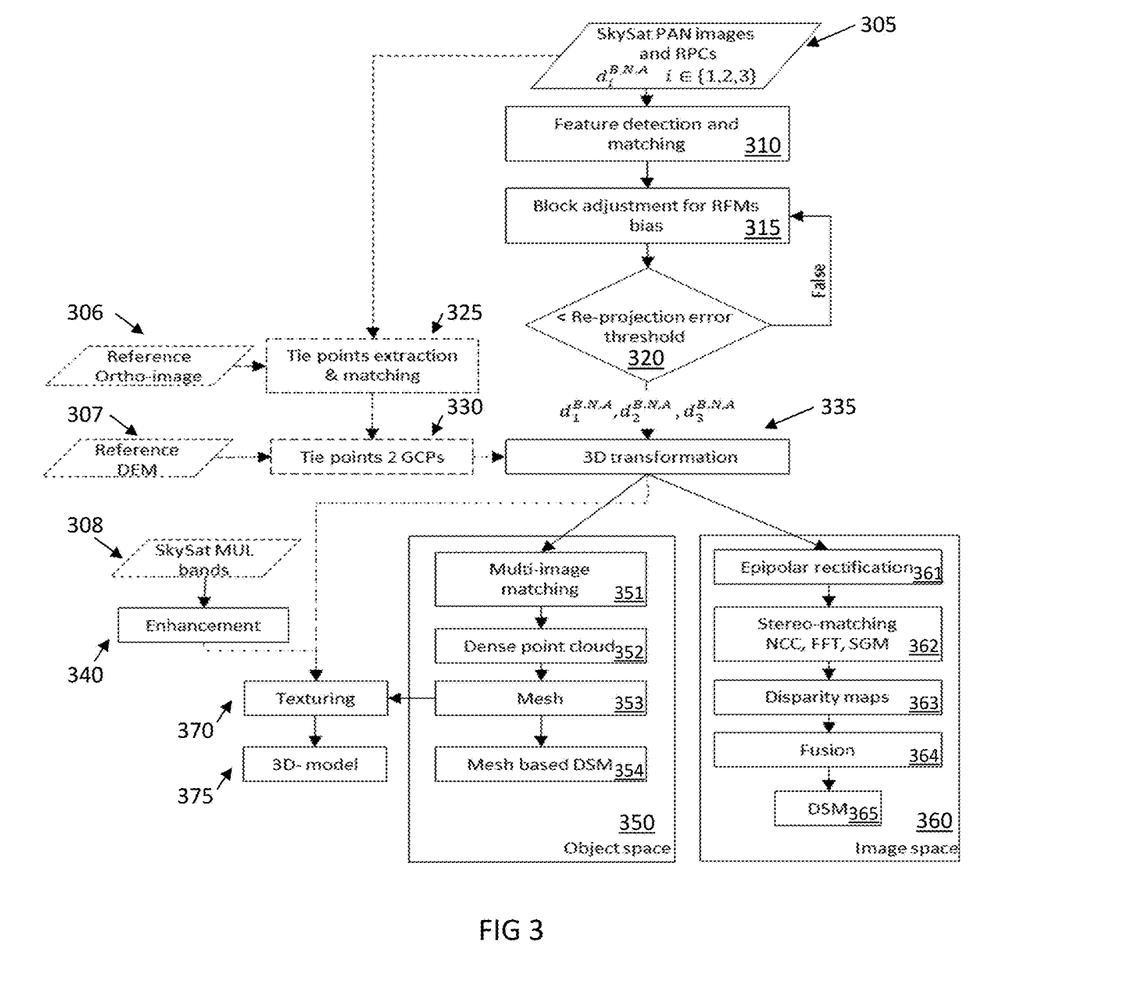
FIG. 3 shows an example flowchart of DSM generation for three-array sensor system.

FIG. 3 shows a more detailed flowchart for an example of when multiple arrays are used from the same platform.

For this example, the frame rate and the location of the arrays in the focal plane of the telescope were designed to ensure some degree of overlap between the different sub-scenes, whether acquired by different arrays at a given time or at successive times by a same array. Each sub-scene is provided with its own RFM and is considered as a separate image in the procedure. Level-1B (L1B) products can be used, which contain the images and associated RFMs which were determined by the provider using a terrain dependent approach. Prior to RFM refinement, image pairs can be pre-selected for each type of platform using a specific procedure.

An example of the specific procedure to select images is oriented to select high-quality pairs from a large number of images available daily and improve the quality of the produced DSMs as much as possible. The specific criteria used to build the image section algorithm can include:

(1) Image count: Each ROI region should be captured by a minimum number of images (minImgNb).
(2) View angle and orbit direction: select images with a viewing angle larger than a user-specified threshold referred as $\beta^{th}$, and prioritize, if possible, images from ascending and descending orbit direction. View angle and orbit orientation are extracted directly from the .xml metadata file of each image.
(3) B/H ratio: for nominal acquisition (e.g., 95% of available L1Bs PlanetScope images are acquired in nominal acquisition mode), select pairs forming a high B/H ratio. This ratio is calculated following Eq. 3 and 4.
(4) Overlap between images: pairs with overlap larger than a specific overlap threshold (overlapTh) are selected for RFM refinement. For example, overlapTh>40%. The image footprints are calculated using their respective RFM.
(5) Temporal baseline: select images acquired at short time separation to reduce as much as possible seasonal ground variation (e.g., vegetation, snow, etc.).

In embodiments of the disclosure, the method includes estimating a three-dimensional transformation using images from a reference array from the plurality of optical arrays.

The panchromatic (PAN) images and rational polynomial coefficients (RPCs) are collected (305). The overlap of consecutive scenes from the same array and within different arrays is very small, as well as the baseline, so rays between tie points are almost collinear. This can normally lead to high uncertainty and singularities during the refinement of the RFM but this can be compensated for in this method (see below).

RPCs can be derived from external high resolution digital elevation models (DEMs) and ground control points (GCPs) extracted from ortho-images. In this case, i is the number of arrays, wherein the RPCs are derived separately for each array: for this example, three. Feature detection and mapping (310) is performed as well as block adjustment for RFM bias (315). If the re-projection error is less than a threshold value (320), 3D transformation is performed (335). This is done from the RPCs and from tie points matched to the GCPs (330). The original images (305) with a reference ortho-image (306) allow for tie point extraction and matching (325), which in turn provides, with a reference DEM (307), the tie points to GCPs (330). The reference DEM (307) constrains the tie points (330) thereby avoiding the above-mentioned issue with high uncertainty and singularities during the refinement. The 3D transformation (335) can be in object space (350) or image space (360). The 3D transformation can be done by using the images from one of the arrays (e.g., the center array of the three) as reference images. An estimate of a global 3D transformation can be used to align the other arrays to the reference array by using match points.

Any manner of determining tie points can be used, as understood by one skilled in the art.

In image space (360), the 3D reconstruction can be produced by epipolar rectification (361), stereo-matching (362), disparity maps creation (363) and fusion (364), and production of a final DSM map.

Epipolar rectification can consist of resampling stereo pairs based on the adjusted RFM, so that the two images have a common orientation and the matching features between the images appear along a common axis.

Stereo-matching can consist of computing the correspondences between pixels of the image pairs. These correspondences can be computed using a correlation technique (e.g., NCC, FFT) or using a Semi-global matching scheme. The results are created as disparity maps.

Disparity maps fusion can be performed by having intermediate results generated from each possible stereo merged to produce a final DSM map. The fusion can be performed using local approaches (e.g., mean, median) or global optimization (e.g., total variation, gradient decent).

The 3D reconstruction in object space (350) can be performed by multi-image matching (351), dense point cloud formation (352), and meshing (353) to produce a mesh-based DSM (354).

Multi-image matching can be performed by an object-based matching algorithm is applied directly in the object space, hence the epipolar rectification is no longer necessary; the transformation between object space and image space rely on the refined RFMs. An example of an object-based matching algorithm is OSGM (object-based multi-image semi-global matching) from Bethmann and Luhmann's "Semi-Global Matching in Object Space" (*ISPRS—Int. Arch. Photogramm. Remote Sens. Spat. Inf. Sci.* 2015, pp. 23-30) the contents of which are incorporated by reference herein.

A spatial forward intersection leads directly to dense 3D point cloud.

Meshing consists of deriving 3D surfaces (a 3D mesh) by interpolating the dense point cloud.

A Mesh-based DEM (e.g., gridded terrain model—2.5D raster map) is derived from the 3D mesh.

Figure 4:
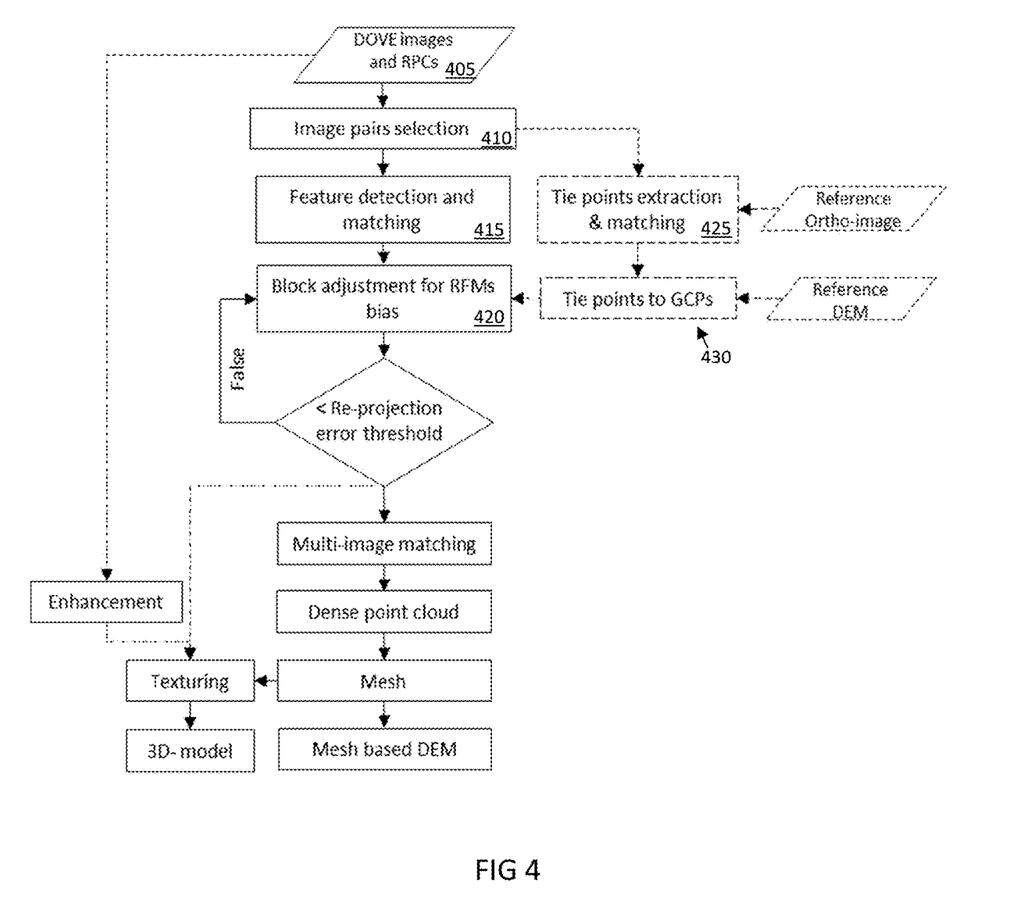
FIG. 4 shows an example flowchart of DSM enhancement for single array sensor system.

An example of the process where there is only one array per platform is provided in FIG. 4. The method is largely similar to that found in FIG. 3, except that the images (405) are single array sensor images (e.g., DOVE) so image pairs need to be selected (410) from different tracks before feature detection and matching (415). The tie points (425) are derived from the pairs (410), which is matched to GCPs (430) for the block adjustment (420). Instead of a reference array being selected, a reference image is used from one of the tracks. From there, the method matches FIG. 3.

Figure 5A:
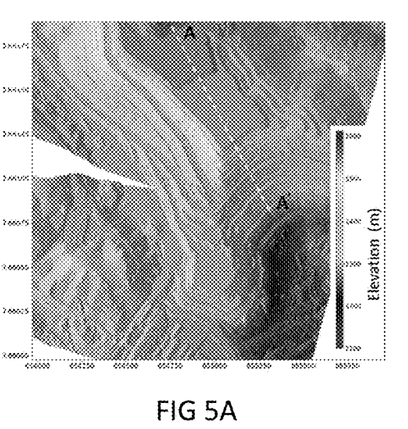
FIGS. 5A-5C show an example of results from the system.
Figure 5B:
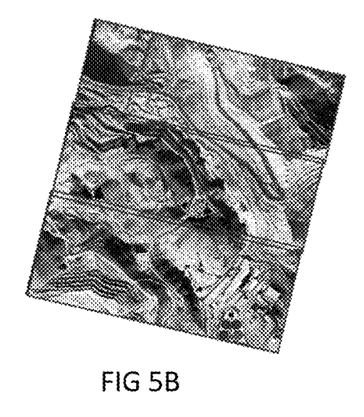
Figure 5C:
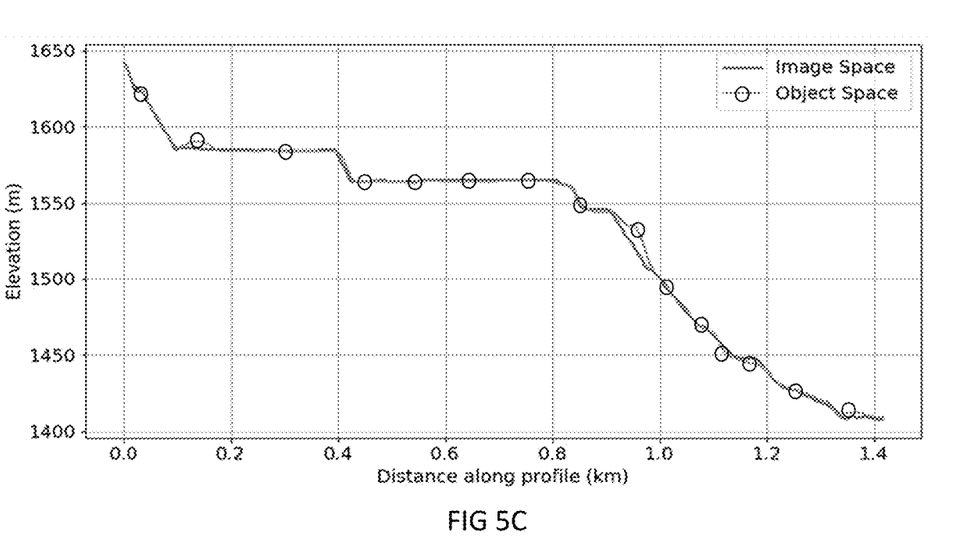

FIGS. 5A-5C show an example of results from the system. FIG. 5A shows a shaded DEM of Morenci Mine computed using SGM in the image space from a tri-stereo array images. FIG. 5B shows an example of sub-scenes covering the area. FIG. 5C shows a profile along the transect (AA') extracted from image space DEM and object space DEM.

Figure 6A:
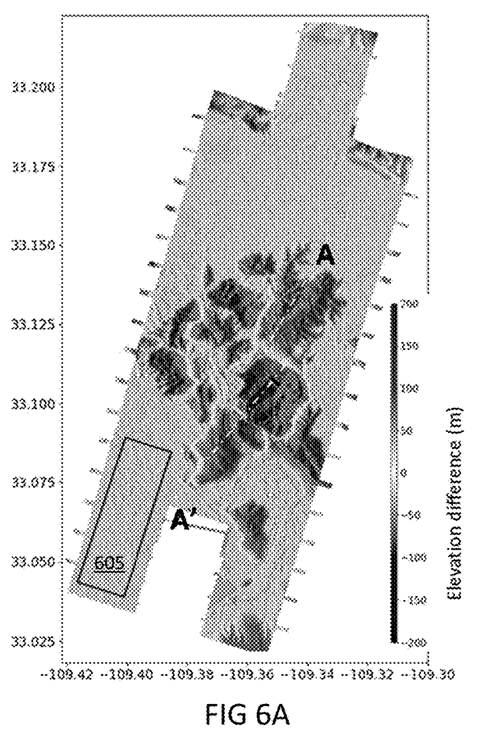
FIGS. 6A-6D show another example of results from the system.
Figure 6B:
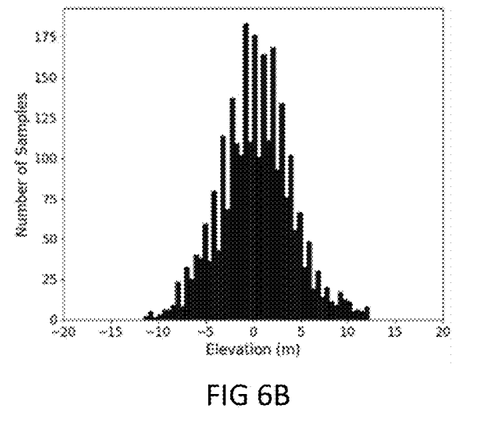
Figure 6C:
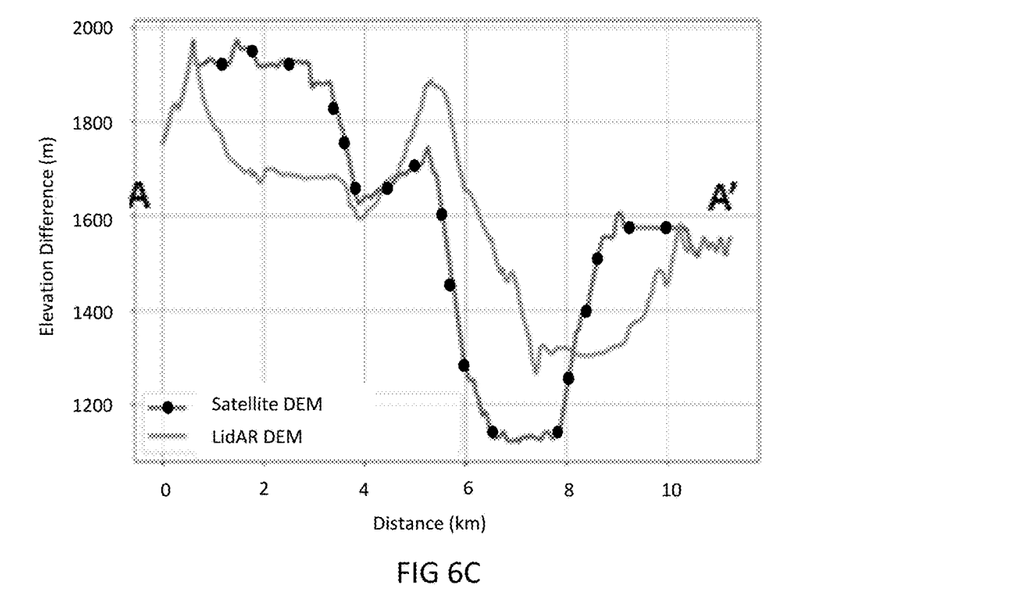
Figure 6D:
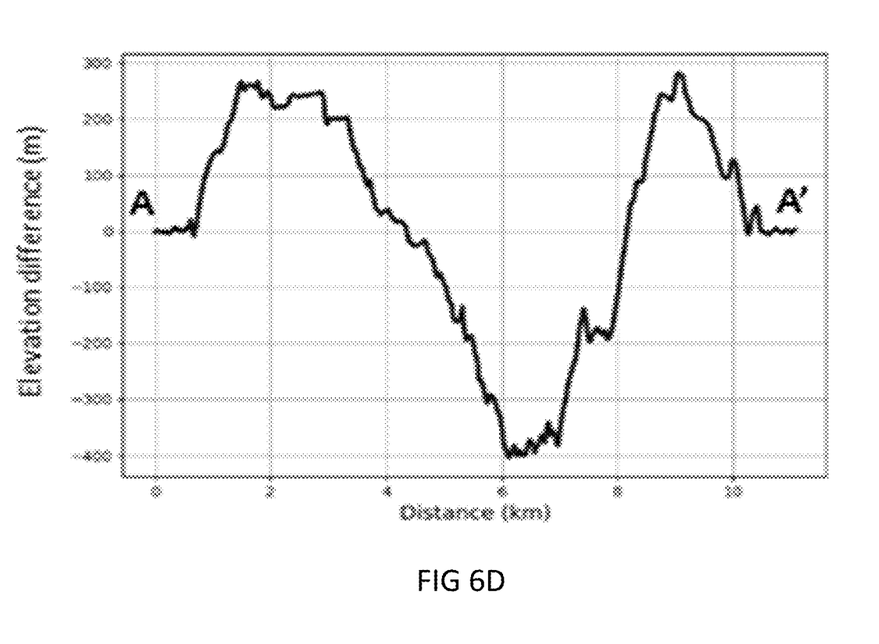

FIGS. 6A-6D show another example of results from the system. FIG. 6A shows elevation changes over Morenci Mine area computed from the difference of a reference LiDAR and a satellite DEM. FIG. 6B shows elevation profiles from the satellite and LiDAR DEMs. FIG. 6C shows an elevation difference profile. Profiles are extracted along transect AA' indicated in FIG. 6A. FIG. 6D shows a histogram of the elevation difference over stable terrain—the box (605) in FIG. 6A.

Figure 7A:
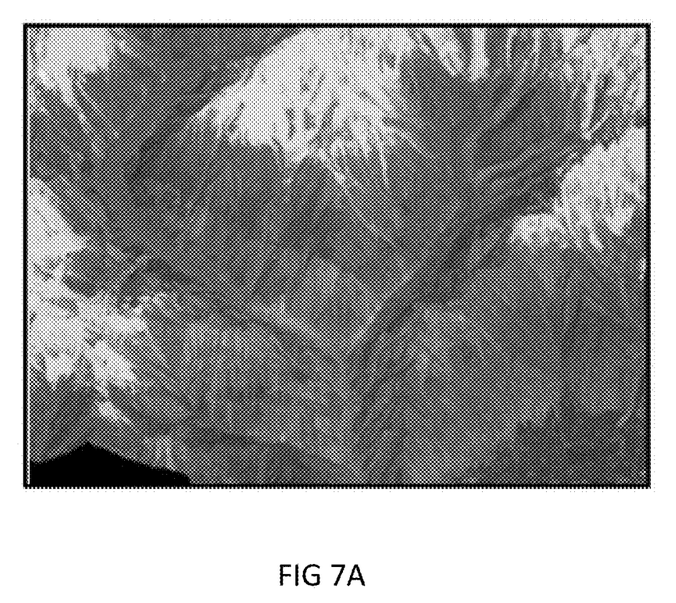
FIGS. 7A-7D show another example of results from the system.
Figure 7B:
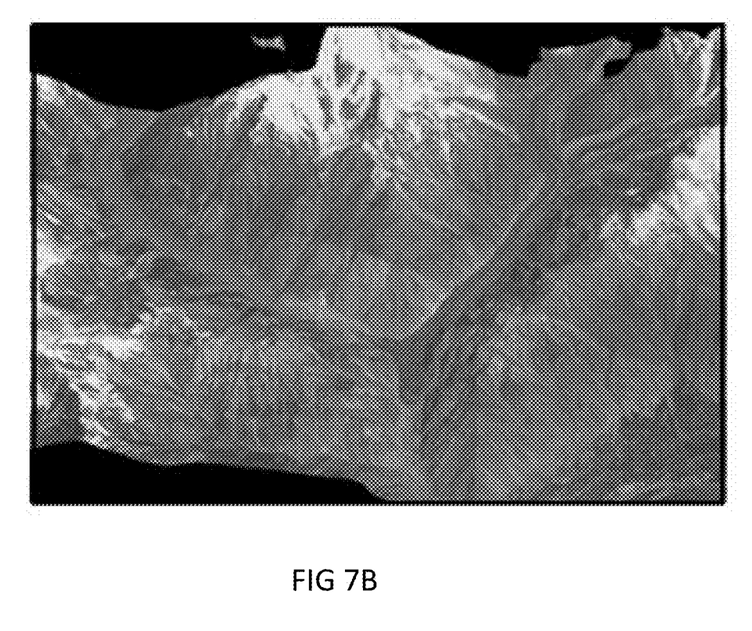
Figure 7C:
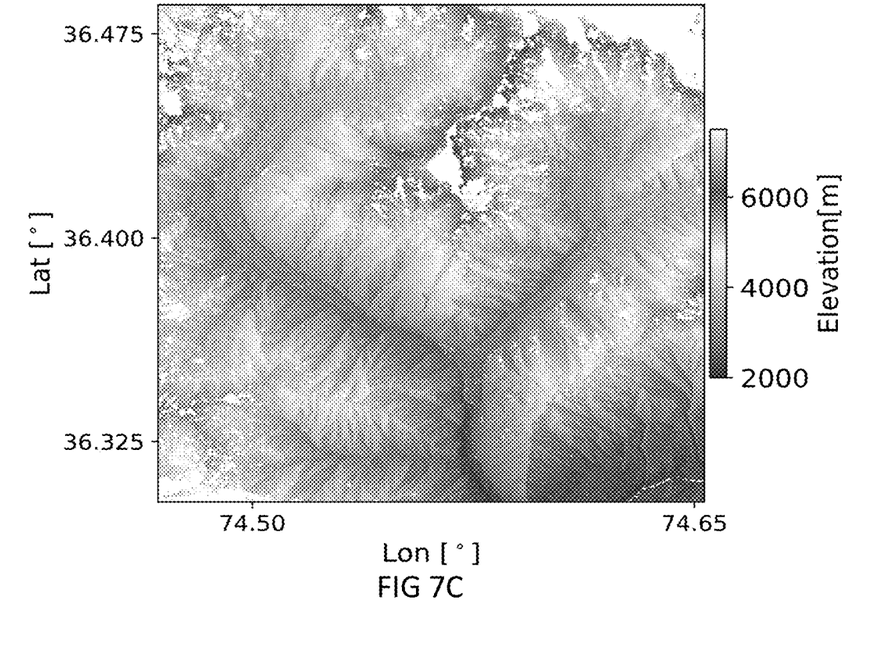
Figure 7D:
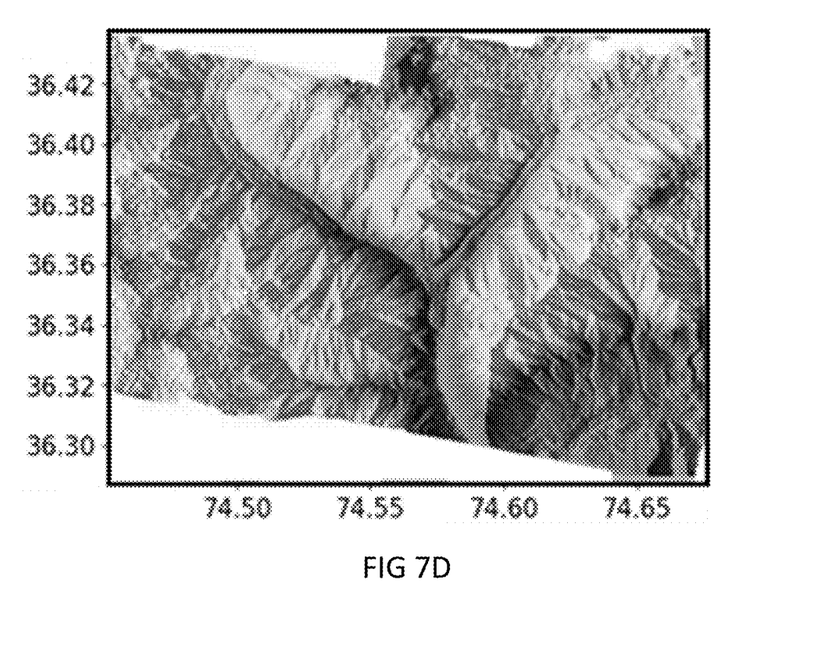

FIGS. 7A-7D show an example of results from the system. FIG. 7A shows a textured 3D model from a 2017 imaging of a glacier (Shisper Glacier, Pakistan). FIG. 7B shows a textured 3D model from 2019. FIGS. 7C and 7D show DEMs extracted from satellite (PlanetScope) data for 2017 and 2019 respectively (greyscale here—normally color coded).

Figure 8A:
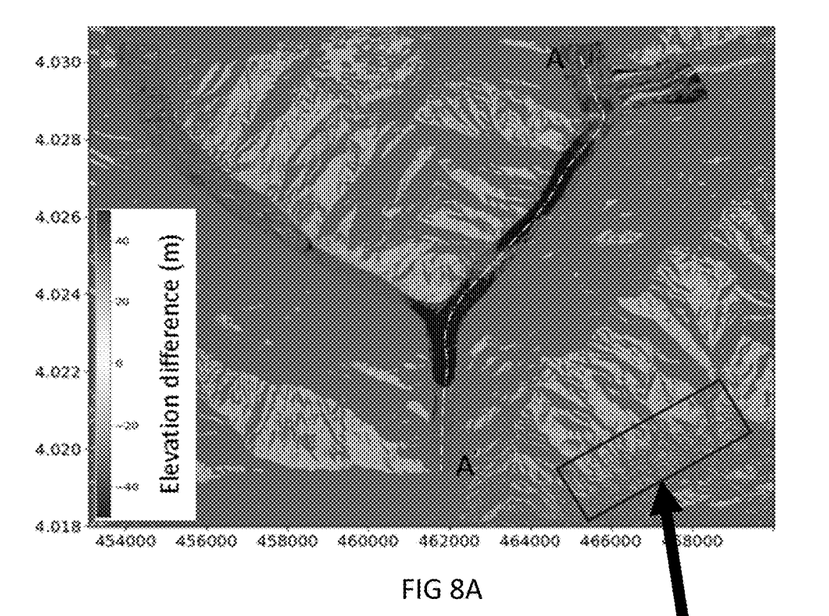
FIGS. 8A-8C show another example of results from the system.
Figure 8B:
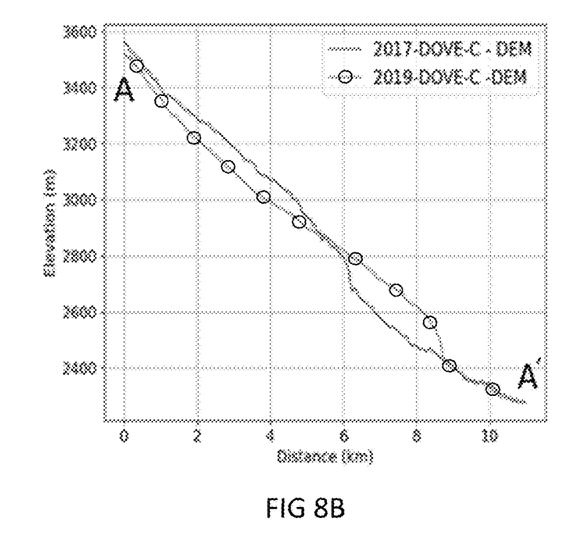
Figure 8C:
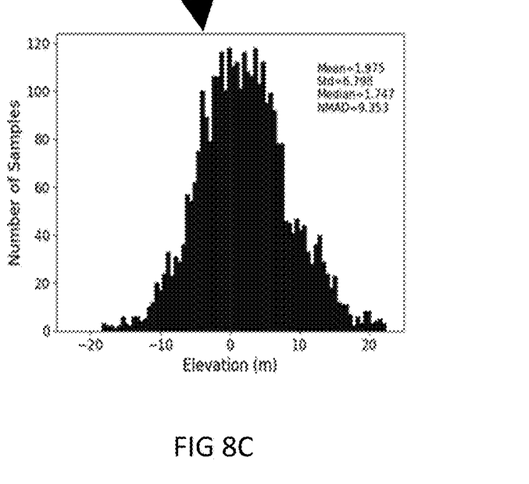

FIGS. 8A-8C show an example of elevation changes as determined by the system. FIG. 8A shows calculated elevation changes determined by the data in FIGS. 7C-7D, overlayed with a hill-shaded DEM (2017). FIG. 8B shows Elevation profiles from the 2017 and 2019 DEMs, with the profiles extracted along the transect A-A' indicated in FIG. 8A. FIG. 8C shows a histogram of the elevation difference over stable terrain (the box in the lower right of FIG. 8A).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a,"

"an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The invention claimed is:

1. A method for refining a rational function model for optical imaging, the method comprising:
    obtaining data from a plurality of detector arrays of a sensor;
    subdividing the data into a plurality of images corresponding to each detector array of the plurality of detector arrays, each detector array corresponding to a different track of images;
    performing rational function model refinement on each of the plurality of images separately for each of the plurality of images; and
    performing a three-dimensional transformation of the plurality of images after refinement using reference images from a reference array from the plurality of detector arrays and tie points matched to ground control points that are constrained by a reference digital elevation model.

2. The method of claim 1, wherein the plurality of detector arrays essentially consists of three arrays.

3. The method of claim 1, wherein the rational function model refinement is sensor agnostic.

4. The method of claim 1, further comprising determining corrective terms for the rational function model.

5. The method of claim 1, wherein the reference array is a central array of the plurality of detector arrays.

6. A non-transient computer readable medium containing code instructing a computer to perform the method of claim 1.

7. A method for refining a rational function model for optical imaging, the method comprising:
    obtaining a first plurality of images from a first sensor comprising a first detector array and a second plurality of images from a second sensor comprising a second detector array, each detector array corresponding to a different track of images;
    determining paired images from the first plurality of images with images from the second plurality of images, wherein the determining comprises comparing a base-to-height ratio to a B/H threshold value;
    subdividing the first and second plurality of images into a plurality of groups corresponding to the paired images;
    performing rational function model refinement on each of the plurality of groups separately for each of the plurality of groups; and
    performing a three-dimensional transformation of the plurality of groups after refinement using a reference image from the first or second plurality of images and tie points matched to ground control points that are constrained by a reference digital elevation model.

8. The method of claim 7, wherein the first sensor is on a first platform and the second sensor is on a second platform.

9. The method of claim 7, wherein the rational function model refinement is sensor agnostic.

10. The method of claim 7, further comprising determining corrective terms for the rational function model.

11. The method of claim 7, wherein the first plurality of images is not parallel to the second plurality of images.

12. The method of claim 7, wherein the determining comprises comparing cross-track overlap between images to a cross-track threshold value.

13. A non-transient computer readable medium containing code instructing a computer to perform the method of claim 7.

14. A method for refining a rational function model for optical imaging, the method comprising:
    obtaining a first plurality of images from a sensor at a first time and a second plurality of images from the sensor at a second time, each plurality of images corresponding to a different track of images;
    determining paired images from the first plurality of images with images from the second plurality of images, wherein the determining comprises comparing cross-track overlap between images to a cross-track threshold value and comparing a base-to-height ratio to a B/H threshold value;
    subdividing the first and second plurality of images into a plurality of groups corresponding to the paired images;
    performing rational function model refinement on each of the plurality of groups separately for each of the plurality of groups; and
    performing a three-dimensional transformation of the plurality of groups after refinement using a reference image from the first or second plurality of images and tie points matched to ground control points that are constrained by a reference digital elevation model.

15. The method of claim 14, wherein the rational function model refinement is sensor agnostic.

16. The method of claim 14, further comprising determining corrective terms for the rational function model.

17. The method of claim 14, wherein the first plurality of images is not parallel to the second plurality of images.

18. A non-transient computer readable medium containing code instructing a computer to perform the method of claim 14.

* * * * *